United States Patent Office 3,101,302
Patented Aug. 20, 1963

3,101,302
PURIFICATION AND RECOVERY OF
FUNGAL AMYLASES
George E. Inglett, Clarendon Hills, Ill., assignor to Corn Products Company, New York, N.Y., a corporation of Delaware
No Drawing. Filed Nov. 30, 1960, Ser. No. 75,640
2 Claims. (Cl. 195—66)

This invention relates to a method for purifying and recovering fungal amylases. More particularly it relates to a method for inactivating transglucosidase in a transglucosidase-clay mineral complex by solvent precipitation of the desirable fungal enzyme activities, glucamylase and alpha-amylase, in the presence of the reagent clay mineral carrier.

Amylase preparations derived from organisms of the *Aspergillus niger* and *Aspergillus flavus-oryzae* groups are used extensively in industry, e.g., in the enzymatic saccharification of partially hydrolyzed starch to form dextrose-containing syrups. However, experience has shown that the formation of unfermentable dextrose polymers is sufficient to limit the usefulness of such preparations, particularly in processes for the production of pure, crystalline dextrose. This will be apparent from the discussion which follows.

Amylase preparations of microbiological origin, particularly those derived from organisms of the *Aspergillus niger* and *Aspergillus flavus-oryzae* groups of the *Aspergillus* genus, contain three major types of enzyme activity concerned with the hydrolysis of alpha-1,4-linked glucose polymers. These three types of activity may be classified as alpha-amylase activity, glucamylase (maltase) activity, and transglucosidase activity.

Alpha-amylase action of starch pastes causes considerable reduction in viscosity. In the absence of appreciable amounts of glucamylase (maltase) activity, considerable amounts of maltose are produced by alpha-amylase action.

Gluc-amylase action on starch and/or maltose results in the formation of dextrose. This type of action has also been referred to as maltase activity, amyloglucosidase activity, glucogenic activity, or starch-glucogenase activity.

Transglucosidase activity results in the formation, particularly from maltose, of unfermentable dextrose polymers containing alpha-1, 6-glucosidic linkages. Pan et al. (Arch, Biochem. Biophys. 42, 421–434 (1953), tested the transglucosidase activity of various laboratory and industrial enzyme preparations and found that fungal amylase preparations exhibited considerable transglucosidase action. Pazur and French (J. Biol. Chem. 196, 265–272 (1952)), showed that the most probable action of the transglucosidase was to transfer a glucosyl radical from maltose to the 6-position of a glucose molecule, or to the 6-position of the nonreducing end of a maltose molecule, resulting in the formation of isomaltose, (6-(a-D-glucopyranosyl)-D-glucose), and panose, (4-(6-(a-D-glucopyranosyl)-alpha-D-glucopyranosyl)-D-glucose), respectively.

From the above description of transglucosidase action, it is readily seen that among the factors which limit the yield of dextrose obtainable through fungal amylase saccharification of amylaceous materials is the enzymatic resynthesis of carbohydrates which are not fermentable, and which are not hydrolyzed to dextrose at an appreciable rate by the enzymes preset in the enzyme preparation.

The main object of this invention is to provide a method for the simultaneous purification of fungal amylases and inactivation of the transglucosidase activity thereof. Other objects will appear hereinafter.

It has previously been discovered that transglucosidase may be removed from fungal amylase preparations in aqueous medium by adsorbing it on clay minerals and separating the medium from the clay mineral. This discovery is described and claimed in copending application Serial No. 77,531, now U.S. Patent No. 3,042,584, which is a continuation-in-part of Serial No. 666,469, now abandoned.

As explained in this previous disclosure, once the transglucosidase has been absorbed upon the clay mineral it is necessary to separate the clay mineral-transglucosidase combination from the medium which contains the desired fungal amylases. Otherwise, when the preparation is added to a starch substrate the transglucosidase is released from the clay mineral, resulting in the same low yields of dextrose as if the clay mineral had not been added in the first place.

Enzymes are known to be adsorbed by many adsorbents. Stone (U.S. Patent 2,717,852) adsorbed starch hydrolyzing enzymes on carbon and clay adsorbent under conditions such that the starch hydrolyzing enzymes no longer were water soluble and could not be eluted from the adsorbent.

In contrast to these results, I have found a process for preparing a starch hydrolyzing enzyme-clay mineral complex in which the desirable starch hydrolyzing enzymes (gluc-amylase and alpha-amylase) are water soluble, and a deleterious enzyme (transglucosidase), which prevents obtaining high yields of dextrose, is inactivated.

Fungal amylase preparations can be freed of transglucosidase activity by treatment with a clay mineral in aqueous solution and the desired fungal amylases can be purified and recovered by precipitation with a water miscible organic solvent by a process requiring only one filtration, thus allowing a far more economical process than was available heretofore.

My process involves first, treating an aqueous solution of fungal amylases with a clay mineral to adsorb the transglucosidase, second (without removing the clay mineral) adding a water miscible organic solvent to precipitate the desired fungal amylases and, finally, separating the solid from the liquid phase, as by filtration. The solid material contains the desired fungal amylases together with inactivated transglucosidase.

It is a surprising discovery that transglucosidase which has been adsorbed on clay mineral can be inactivated by contacting with an aqueous solution of a water miscible organic solvent while the transglucosidase is still adsorbed on the clay mineral, whereas if not contacted with solvent the enzyme is not inactivated but is released in active form if the clay mineral-transglucosidase combination is added to a starch substrate. This is all the more surprising since when transglucosidase is precipitated along with the other enzymes of a fungal amylase preparation by addition of a water miscible solvent—no clay mineral having been added—the transglucosidase is not inactivated by contact with the solvent.

My discovery that transglucosidase can be inactivated in this manner has led to a greatly simplified and much more economical process than was hitherto known for preparing a purified fungal amylase preparation, devoid of transglucosidase activity, and capable of converting starch to dextrose in substantially higher yields than are obtained by the untreated enzyme preparation.

In carrying out the reaction, the clay mineral and the enzyme preparation in aqueous medium should first be mixed and then the water miscible solvent added. After separation of the fungal amylase-clay mineral preparation from the liquid, the enzyme preparation may be used as is or dried in a conventional manner.

The enzyme preparation may consist, for example, of the whole culture liquor obtained from submerged growth of an amylase-producing microorganism; the clarified liquor obtained from the submerged culture; a suspension of a dried or partially dried preparation which may contain bran, starch or various other adulterants used in standardizing the amylase preparation, or a solution of a completely soluble enzyme preparation.

In general, any clay mineral may be used as an inactivating transglucosidase adsorbent. The clay minerals, as a group, are described as "silicates of alumina." The clay minerals are essentially hydrous aluminum silicates, with magnesium or iron proxying wholly or in part for the aluminum in some minerals, and with alkalis or alkaline earths present as essential constituents in others. Some are further described as fullers' earth, floridin, sub-bentonite, fire clay, china clay, and ball clay. They may range in composition from nearly pure magnesium silicate to aluminum silicate, and may also be synthesized from the component oxides or salts, or by reaction of crystalline minerals with chemical reagents. For details see data sheet No. 204, American Colloid Company (1945); and Industrial Minerals and Rocks, Amer. Inst. Mining and Met. Eng. (1949 ed.), and Clay Minerology (R. E. Grim, McGraw-Hill (1953), p. 18, 19). The amount of clay mineral used as adsorbent for the enzyme will depend to a certain extent upon the species of clay mineral used, the amount or transglucosidase present, and the amount of extraneous material present. For most enzyme preparations the amount used should be at least about 1.0 gram per 100 ml. of enzyme preparation.

The comparative transglucosidase content of some fungal amylase-clay mineral complexes determined by the dextrose content of starch hydrolyzate is shown as follows:

| Adsorbent | Amount, percent | Comparative transglucosidase content of enzyme preparation |
|---|---|---|
| 1. None | | 100 |
| 2. Volclay (bentonite clay) | 1.0 | 60 |
| 3. Volclay | 2.0 | 0 |
| 4. Volclay | 5.0 | 0 |
| 5. Filtrol (montmorillite clay) | 5.0 | 60 |
| 6. Tixoton (montmorillite clay) | 5.0 | 40 |
| 7. Florex (floridin clay) | 2.0 | 60 |
| 8. Grundite (illite clay) | 5.0 | 20 |
| 9. Alcco-Sol (magnesium silicate) | 5.0 | 60 |
| 10. Magnesol (magnesium silicate) | 2.0 | 40 |

The water miscible solvents that can be used to inactivate transglucosidase in the transglucosidase-clay mineral complex are the ones generally used for precipitation of amylase from solution, such as acetone, ethanol, or 2-propanol. These solvents give enzyme-clay mineral preparations having the followiwng comparative transglucosidase contents when fungal amylases are precipitated on 2 percent Volclay.

| Solvent | Amount, percent | Comparative transglucosidase content of enzyme preparation |
|---|---|---|
| 1. None | | 100 |
| 2. Acetone | 60 | 60 |
| 3. Ethanol | 60 | 40 |
| 4. 2-propanol | 50 | 20 |
| 5. 2-propanol | 60 | 0 |

While some portion of the solvent may be added prior to or simultaneously with the clay, it is important that the clay mineral contact the enzyme preparation prior to the point at which the solvent concentration will precipitate transglucosidase. The ratio of solvent to water should be between 1:1 and 2:1, preferably 1.5:1.

In general, the pH value of the enzyme during contact with the clay mineral should be 3.0–5.5, or the pH value at which transglucosidase is adsorbed by the clay mineral.

For most fungal amylase preparations, a pH value of 3.8–4.2 gives the best inactivation of transglucosidase consistent with maximum recovery of gluc-amylase and alpha-amylase.

The process is particularly applicable to enzyme preparations derved from members of the *Aspergillus niger* group (see "A Manual of the Aspergilli," by Thom and Raper, Williams and Wilkins Company, 1945), such as for example, *Aspergillus awamori, Aspergillus niger, Aspergillus phoenicis, Aspergillus fonsecaeus, Aspergillus carbonarius,* and *Aspergillus luchuensis.* It is also applicable to enzyme preparations derived from organisms of the Rhizopus genus, such as for example *Rhizopus delemar.*

Before the examples are given, a description of the determination of gluc-amylase will be given.

*Determination of gluc-amylase activity.*—The substrate is a 15–18 D.E. spray-dried acid hydrolyzate of corn starch. This material is dissolved in water and diluted to 4.0 grams of dry substance per 100 ml. of solution. Exactly 50 ml. of the solution is pipetted into a 100 ml. volumetric flask. To the flask is added 5.0 ml. of pH 4.3, 1.0 molar sodium acetate acetic acid buffer. The flask is placed in a water bath at 60° C., and after 10 minutes, the proper amount of enzyme preparation is added. At exactly 120 minutes after addition of the enzyme preparation, the solution is adjusted to a phenolphthalein end point with one normal sodium hydroxide. The solution is then cooled to room temperature, and diluted to volume. A reducing sugar value, calculated as dextrose, is determined on the diluted sample and on a control with no enzyme preparation added. Gluc-amylase activity is calculated as follows:

$$A = \frac{S-B}{2 \times E}$$

where $A$ = gluc-amylase activity, units per ml. or per gram of enzyme preparation.

$S$ = reducing sugars in enzyme converted sample, grams per 100 ml.

$B$ = reducing sugars in control, grams per 100 ml.

$E$ = amount of enzyme preparation used, ml. or grams.

The reducing sugar concentration in the enzyme-converted sample should be not more than 1.0 gram per 100 ml.

The following examples are set forth for illustrative purposes.

*Example 1*

In 1 liter of aqueous *Aspergillus niger* preparation at pH value of 4.0, 20 grams of Volclay were dispersed by agitation for approximately 30 minutes. A 1.5-liter portion of 2-propanol was added to the dispersion with continued agitation for approximately 10 minutes. The suspended solids of fungal amylase on the clay material were collected on a filter and the filtrate discarded. The enzyme preparation was dried at 25° C. for 24 hours under 25-inches vacuum. The dried enzyme preparation was used to convert corn starch hydrolyzate having a D.E. (dextrose equivalent) of 16 percent to dextrose as follows.

A portion of the dried enzyme preparation containing 49 units of gluc-amylase was added to a 1000-gram portion of 35 percent D.S., 16 D.E. starch hydrolyzate. Conversion of the 16 D.E. hydrolyzate was carried out at 60° C., pH 4.2–4.5 for 72 hours. After conversion, the enzyme-saccharified hydrolyzate was analyzed for dextrose content. The procedure was repeated using varying amounts of Volclay. The following dextrose contents of the hydrolyzates are shown for enzyme-Volclay preparations that were prepared using from 1 to 5 percent Volclay based on the volume of aqueous fungal amylase preparation.

| Adsorbent | Amount, percent | Dextrose content of hydrolyzate, percent of dry substance |
|---|---|---|
| 1. None | | 86 |
| 2. Volclay | 1.0 | 88 |
| 3. Volclay | 2.0 | 91 |
| 4. Volclay | 5.0 | 91 |

*Example II*

In 1 liter of aqueous *Aspergillus niger* preparation at pH 4.0, 20 grams of Grundite were dispersed by agitation for nearly 30 minutes. A 1.5-liter portion of 2-propanol was added to the dispersion with continued agitation for 10 minutes. The suspended solid enzyme on clay mineral was collected on a filter and the filtrate discarded. The enzyme preparation was dried at 25° C. for 24 hours under a vacuum. The dried enzyme preparation was used to convert 16 D.E. corn starch hydrolyzate to dextrose as described by the procedure in the previous example. Other clay minerals were used in the above procedure. The results of these preparations to convert corn starch hydrolyzate to dextrose are shown below.

| Clay Mineral | Amount, percent | Dextrose content of hydrolyzate, percent of dry substance |
|---|---|---|
| 1. None | | 86 |
| 2. Grundite | 5.0 | 90 |
| 3. Magnesol | 2.0 | 89 |
| 4. Tixoton | 5.0 | 89 |
| 5. Filtrol | 5.0 | 88 |
| 6. Alcco-sol | 5.0 | 88 |
| 7. Florex | 2.0 | 88 |

*Example III*

In 1 liter of aqueous *Aspergillus niger* preparation at pH 4.0, 20 grams of Volclay were dispersed by agitation for nearly 30 minutes. A 1.5-liter portion of ethanol was added to the dispersion with continued agitation for 10 minutes. The suspended solids were collected on a filter and dried as described for the other enzyme preparations. Another enzyme preparation was obtained as described above except acetone was used as the solvent. These preparations were used to convert 16 D.E. corn starch hydrolyzate to dextrose as described by the procedure in Example I.

| Clay mineral | Solvent | Dextrose content of hydrolyzate, percent of dry substance |
|---|---|---|
| 1. None | | 86 |
| 2. Volclay | Ethanol | 89 |
| 3. Volclay | Acetone | 88 |
| 4. Volclay | 2-propanol | 91 |

*Example IV*

In 1 liter of aqueous *Aspergillus niger* preparation at pH 4.0, 20 grams of Volclay were dispersed by agitation for nearly 30 minutes. An equal volume of 2-propanol was used for precipitation of the fungal amylases on the clay mineral. After 10 minutes of continued agitation, the enzyme-Volclay solid was collected on a filter and the filtrate discarded. The preparation was dried and used to convert 16 D.E. corn starch hydrolyzate to 90 percent dextrose content.

*Example V*

In 1 liter of aqueous *Aspergillus niger* preparation at pH 4.0, 20 grams of Volclay were dispersed by agitation for nearly 30 minutes. A 1.5-liter portion of 2-propanol was added with continued agitation for 10 minutes. The enzyme-Volclay solid was collected on a filter and the filtrate discarded. The damp cake was suspended in 1 liter of water with agitation. The Volclay was collected on a filter and discarded. The filtrate containing the starch hydrolyzing enzymes was assayed for gluc-amylase and found to contain substantially all of the original gluc-amylase activity. A portion of the filtrate equivalent to 49 units of gluc-amylase was used to convert 16 D.E. corn starch hydrolyzate to 92 percent dextrose (dry basis) by the procedure described under Example I.

*Example VI*

In 1 liter of aqueous *Aspergillus niger* preparation (2000 gluc-amylase units) at pH 4.0, 20 grams of Volclay were dispersed by agitation for nearly 30 minutes. A 1.5-liter portion of 2-propanol was added to the dispersion with continued agitation for 10 minutes. The suspended enzyme on Volclay was collected on a filter and dried at 25° C. for 24 hours under 25-inches vacuum to give 28 grams of enzyme preparation having 1840 gluc-amylase units.

The 28-gram sample of Volclay-enzyme was suspended in 1 liter of water. The pH was adjusted to 4.0, and the mixture stirred 10 minutes. The insoluble material was collected on a filter and discarded. The filtrate contained 1800 units of gluc-amylase activity, representing a 90 percent recovery of gluc-amylase from the original aqueous fungal amylase preparation. This enzyme preparation converted 16 D.E. starch hydrolyzate to 92 percent dextrose (dry basis).

Examples V and VI show that the enzymes that are responsible for hydrolyzing starch to dextrose in the clay mineral-fungal amylase complexes are present in water soluble form.

I claim:

1. A process for the purification and recovery of fungal amylase preparations obtained from an organism selected from the group consisting of members of the Aspergillus genus and members of the Rhizopus genus which comprises the following steps: first, mixing such preparations in aqueous medium with a clay mineral; second, adding a water miscible organic solvent selected from the group consisting of acetone, ethanol and 2-propanol in amount sufficient to precipitate the starch hydrolyzing enzymes on the clay mineral in water soluble form; third, separating the resultant clay mineral-enzyme mixture from the liquid; the ratio of solvent to water being between 1:1 and 2:1.

2. A process for hydrolyzing starch to dextrose which comprises treating a partially hydrolyzed starch with the product recovered from claim 1.

References Cited in the file of this patent

Cereal Chemistry, vol. 26, 1949, pages 98 to 109.

UNITED STATES PATENT OFFICE
CERTIFICATE OF CORRECTION

Patent No. 3,101,302 August 20, 1963

George E. Inglett

It is hereby certified that error appears in the above numbered patent requiring correction and that the said Letters Patent should read as corrected below.

Column 1, line 35, for "of" read -- on --; line 67, for "preset" read -- present --; column 3, line 53, for "followiwng" read -- following --; column 4, line 6, for "derved" read -- derived --; line 58, for "material" read -- mineral --.

Signed and sealed this 7th day of April 1964.

(SEAL)
Attest:
ERNEST W. SWIDER
Attesting Officer

EDWARD J. BRENNER
Commissioner of Patents